United States Patent
Izumi

(10) Patent No.: US 10,537,964 B2
(45) Date of Patent: Jan. 21, 2020

(54) LASER MACHINING APPARATUS AND LASER MACHINING METHOD FOR PERFORMING LASER MACHINING WHILE CONTROLLING REFLECTED LIGHT

(71) Applicant: FANUC CORPORATION, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 15/593,704

(22) Filed: May 12, 2017

(65) Prior Publication Data
US 2017/0334019 A1    Nov. 23, 2017

(30) Foreign Application Priority Data
May 17, 2016 (JP) .................................. 2016-098653

(51) Int. Cl.
| B23K 26/03 | (2006.01) |
| B23K 26/60 | (2014.01) |
| B23K 26/70 | (2014.01) |

(52) U.S. Cl.
CPC ............ B23K 26/032 (2013.01); B23K 26/60 (2015.10); B23K 26/705 (2015.10)

(58) Field of Classification Search
CPC .. B23K 26/0665; B23K 26/032; B23K 26/60; B23K 26/705
(Continued)

(56) References Cited

U.S. PATENT DOCUMENTS

| 5,841,096 A * | 11/1998 | Takahashi ............... H01S 3/102 |
| | | 219/121.62 |
| 7,173,227 B2 * | 2/2007 | Iwata ................... B23K 26/032 |
| | | 219/121.62 |

(Continued)

FOREIGN PATENT DOCUMENTS

| CN | 101522361 A | 9/2009 |
| CN | 101909808 A | 12/2010 |

(Continued)

OTHER PUBLICATIONS

Decision to Grant a Patent for Japanese Application No. 2016-098653, dated Apr. 24, 2018, including English translation, 3 pages.

*Primary Examiner* — Jimmy Chou
(74) *Attorney, Agent, or Firm* — RatnerPrestia

(57) ABSTRACT

A laser machining method includes the steps of: outputting a laser beam to the workpiece at a laser power low enough not to melt or oxidize the workpiece to measure reflected light of the laser beam; selecting a laser power suitable for melting or oxidizing the workpiece based on a measured value of the reflected light; determining whether or not the workpiece can be melted or oxidized based on the selected laser power; when the workpiece can be melted or oxidized, outputting a laser beam to the workpiece at a laser power high enough to melt or oxidize the workpiece; outputting again a laser beam to the workpiece at the low laser power to measure reflected light of the laser beam; and checking the degree of the melting or oxidization of the workpiece based on a measured value of the reflected light to determine whether or not to start laser machining.

9 Claims, 15 Drawing Sheets

(58) Field of Classification Search
USPC .............. 219/121.6, 121.61, 121.62, 121.66,
219/121.67, 121.69, 121.71, 121.72;
700/166
See application file for complete search history.

(56) References Cited

U.S. PATENT DOCUMENTS

| | | | |
|---|---|---|---|
| 8,258,429 B2 | 9/2012 | Kobayashi et al. | |
| 8,294,123 B2 * | 10/2012 | Nakamae | B23K 26/03 |
| | | | 250/491.1 |
| 8,435,437 B2 * | 5/2013 | Jow | A61F 2/91 |
| | | | 264/400 |
| 8,890,028 B2 * | 11/2014 | Mori | B23K 26/00 |
| | | | 219/121.83 |
| 9,012,805 B2 | 4/2015 | Atsumi et al. | |
| 10,112,257 B1 * | 10/2018 | Thomas | B23K 26/032 |
| 2003/0183608 A1 * | 10/2003 | Yamazaki | B23K 26/0853 |
| | | | 219/121.83 |
| 2006/0243708 A1 * | 11/2006 | Ikenoue | B23K 26/032 |
| | | | 219/121.62 |
| 2007/0114213 A1 * | 5/2007 | Chen | B23K 26/032 |
| | | | 219/121.75 |
| 2009/0007933 A1 * | 1/2009 | Thomas | B08B 7/0042 |
| | | | 134/1 |
| 2010/0155375 A1 * | 6/2010 | Dietz | B23K 26/03 |
| | | | 219/121.18 |
| 2013/0200049 A1 * | 8/2013 | Choi | B23K 26/043 |
| | | | 219/121.61 |
| 2013/0218321 A1 * | 8/2013 | Miyamoto | B23K 26/38 |
| | | | 700/166 |
| 2017/0334019 A1 | 11/2017 | Izumi | |

FOREIGN PATENT DOCUMENTS

| | | | | |
|---|---|---|---|---|
| CN | 103260816 A | | 8/2013 | |
| CN | 103372721 A | | 10/2013 | |
| JP | H0276684 U | | 6/1990 | |
| JP | 2004-074253 A | | 3/2004 | |
| JP | 2005014021 A | | 1/2005 | |
| JP | 2006247681 A | | 9/2006 | |
| JP | 2010125502 A | | 6/2010 | |
| JP | 2013107089 A | * | 6/2013 | ............. B23K 26/00 |
| JP | 20130107089 A | | 6/2013 | |
| JP | 2014/117730 A | | 6/2014 | |
| JP | 2017205775 A | | 11/2017 | |
| WO | WO 2013/014994 A1 | | 1/2013 | |

\* cited by examiner

FIG. 5

| KINDS OF WORKPIECE | REFERENCE VALUE (±3W) OF THE REFLECTED LIGHT OF A LASER BEAM EMITTED AT 100W FOR 1ms | LASER POWER SUITABLE FOR MELTING OR OXIDIZING THE WORKPIECE |
|---|---|---|
| CAST IRON | 16W | 550W |
| SPCC | 50W | 1200W |
| SUS 304 (COLD FINISH) | 82W | 1800W |
| SUS304 | 64W | 1400W |
| ALUMINUM #5000 | 89W | 2000W |
| ALUMINUM #1000 | 95W | 2500W |
| BRASS | 95W | 2500W |
| COPPER | 98W | 2800W |

FIG. 6

| MAXIMUM OUTPUT POWER OF THE LASER OSCILLATOR | 5000W |
|---|---|

FIG. 11

| KINDS OF WORKPIECE | FOCUS POSITION RELATIVE TO THE WORKPIECE: 0mm REFERENCE VALUE (±3W) OF THE REFLECTED LIGHT OF A LASER BEAM OUTPUT AT 100W | FOCUS POSITION RELATIVE TO THE WORKPIECE: 3mm REFERENCE VALUE (±3W) OF THE REFLECTED LIGHT OF A LASER BEAM OUTPUT AT 100W | FOCUS POSITION RELATIVE TO THE WORKPIECE: 5mm REFERENCE VALUE (±3W) OF THE REFLECTED LIGHT OF A LASER BEAM OUTPUT AT 100W | FOCUS POSITION RELATIVE TO THE WORKPIECE: 10mm REFERENCE VALUE (±3W) OF THE REFLECTED LIGHT OF A LASER BEAM OUTPUT AT 100W | LASER POWER SUITABLE FOR MELTING OR OXIDIZING THE WORKPIECE * |
|---|---|---|---|---|---|
| CAST IRON | 16W | 14W | 12W | 8W | 250W |
| SPCC | 50W | 46W | 42W | 28W | 600W |
| SUS 304 (COLD FINISH) | 82W | 65W | 59W | 45W | 800W |
| SUS304 | 64W | 52W | 47W | 38W | 650W |
| ALUMINUM #5000 | 89W | 71W | 64W | 52W | 950W |
| ALUMINUM #1000 | 95W | 78W | 71W | 52W | 980W |
| BRASS | 95W | 78W | 71W | 52W | 980W |
| COPPER | 98W | 80W | 83W | 64W | 1050W |

* THE DATA APPLIES WHEN THE SPOT DIAMETER AT THE FOCAL POSITION IS 100μm

FIG. 12

| LASER INFORMATION | MAXIMUM POWER OF THE LASER OSCILLATOR | FOCAL DISTANCE OF THE COLLIMATION LENS | FOCAL DISTANCE OF THE FOCUSING LENS | FIBER DIAMETER | FOCAL POSITION RELATIVE TO THE NOZZLE | ANGLE OF DIVERGENCE |
|---|---|---|---|---|---|---|
| | 5000W | 100mm | 200mm | 100 μm | +3mm | 1.7° |

FIG. 13

| FOCUS POSITION RELATIVE TO THE WORKPIECE | SPOT DIAMETER ON THE WORKPIECE SURFACE |
|---|---|
| 0mm | 200 μm |
| 3mm | 250 μm |
| 5mm | 300 μm |
| 10mm | 450 μm |

LASER MACHINING APPARATUS AND LASER MACHINING METHOD FOR PERFORMING LASER MACHINING WHILE CONTROLLING REFLECTED LIGHT

BACKGROUND OF THE INVENTION

1. Field of the Invention

The present invention relates to a laser machining apparatus and a laser machining method for performing laser machining while controlling reflected light.

2. Description of the Related Art

Laser machining is performed in accordance with machining conditions selected for material to be cut, the thickness of the material, and the like. At the beginning of a laser machining process, a strong reflected light often causes the laser machining to be interrupted or stopped. Techniques for avoiding troubles caused by reflected light are known, for example, by the following patent literature.

Japanese Unexamined Patent Publication (Kokai) No. 2014-117730 describes an invention in which, in a preparatory machining conducted before the laser machining, the laser beam is output on a piercing condition with varied focus positions, the position at which the reflected light is weakest is stored in a memory, and the piercing (bore making) is carried out at that position.

Japanese Examined Patent Publication (Kokoku) No. 4174267 describes an invention in which the laser beam is emitted in pulses before a piercing or cutting process and when the reflected light measured exceeds a prescribed value, the width of the laser beam pulse is shortened.

PCT International Publication No. 2013/014994 describes an invention in which the laser beam is output to a workpiece, and whether the preset machining condition is a proper one for the workpiece or not is determined by checking the reflected light.

SUMMARY OF INVENTION

Laser machining with a laser beam, such as piercing, cutting, marking or welding, may accompany defects or strong reflected light when:

(1) the machining condition is not known for the material to be machined, (2) the machining condition selected has been erroneously inputted, or (3) reflectance of the workpieces widely varies depending on surface conditions, inclination and the like even when they are made of the same material.

A very strong reflected light sent back to the laser oscillator would destroy the laser oscillator in an instant. A strong reflected light repeatedly sent back to the laser oscillator would lead to a trouble. Thus, there has been a problem of reflected light causing laser machining to stop, hindering stable production.

Therefore, there is a demand for a technique for controlling reflected light from the workpiece to avoid damage on the laser oscillator to stably perform laser machining.

A first aspect of the present invention provides a laser machining method executed in a laser machining apparatus that outputs a laser beam from a cutting head to a workpiece and performs laser machining while controlling reflected light of the output laser beam, the laser machining method including the steps of: outputting a laser beam to the workpiece for a setting time at a laser power low enough not to melt or oxidize the workpiece to measure reflected light of the output laser beam before performing laser machining on the workpiece; selecting a laser power suitable for melting or oxidizing the workpiece based on a measured value of the reflected light; determining whether or not the workpiece can be melted or oxidized based on the selected laser power suitable for melting or oxidizing the workpiece; when it is determined that the workpiece can be melted or oxidized, outputting a laser beam to the workpiece for a setting time at a laser power high enough to melt or oxidize the workpiece; outputting again a laser beam to the workpiece for a setting time at the low laser power to measure reflected light of the output laser beam; and checking whether or not the workpiece has been melted or oxidized based on a measured value of the reflected light to determine whether or not to start the laser machining.

A second aspect of the present invention provides a laser machining method according to the first aspect, wherein the laser machining apparatus includes a first database containing a reference value of the reflected light when a laser beam is output to the workpiece for a setting time at the low laser power, the reference value being associated with a laser power suitable for melting or oxidizing the workpiece, and a second database containing a maximum output power of the laser machining apparatus; wherein the step of selecting a laser power suitable for melting or oxidizing the workpiece includes the step of referring to the first database to select a laser power suitable for melting or oxidizing the workpiece associated with the reference value of the reflected light, based on the measured value of the reflected light; and wherein the step of determining whether or not the workpiece can be melted or oxidized includes the step of determining whether or not the workpiece can be melted or oxidized based on the selected laser power suitable for melting or oxidizing the workpiece and the maximum output power of the laser machining apparatus contained in the second database.

A third aspect of the present invention provides a laser machining method according to the first aspect, wherein the step of selecting a laser power suitable for melting or oxidizing the workpiece includes the step of selecting a laser power suitable for melting or oxidizing the workpiece based on a reflectance calculated from the output value of the low laser power and the measured value of the reflected light, and wherein the step of determining whether or not the workpiece can be melted or oxidized includes the step of determining whether or not the workpiece can be melted or oxidized based on the selected laser power suitable for melting or oxidizing the workpiece and a maximum output power of the laser, machining apparatus.

A fourth aspect of the present invention provides a laser machining method according to the first aspect, wherein the step of outputting a laser beam to the workpiece for a setting time at the high laser power is repeated when the workpiece is melted or oxidized insufficiently.

A fifth aspect of the present invention provides a laser machining method according to the fourth aspect, further including the step of extending the period of time during which a laser beam is output before repeating the step of outputting a laser beam to the workpiece for a setting time at the high laser power.

A sixth aspect of the present invention provides a laser machining method according to the fourth aspect, further including the step of changing a focal position to increase laser power before repeating the step of outputting a laser beam to the workpiece for a setting time at the high laser power.

A seventh aspect of the present invention provides a laser machining method according to any one of the first to sixth aspects, wherein the laser machining apparatus further includes a third database containing a spot diameter on a workpiece surface.

An eighth aspect of the present invention provides a laser machining method according to any one of the first to seventh aspects, wherein the laser machining apparatus further includes a fourth database containing characteristics of the laser beam and optical specifications of the cutting head, and wherein the method further includes the step of calculating a spot diameter at a focal position based on the fourth database.

A ninth aspect of the present invention provides a laser machining method according to any one of the eight aspects, wherein the laser machining apparatus further includes a gap sensor configured to measure a distance between the workpiece and a nozzle of the cutting head, and wherein the step of selecting a laser power suitable for melting or oxidizing the workpiece further includes the steps of calculating a spot diameter on a workpiece surface based on the distance between the workpiece and the nozzle of the cutting head, and selecting a laser power suitable for melting or oxidizing the workpiece based on the calculated spot diameter on the workpiece surface.

A tenth aspect of the present invention provides a laser machining apparatus that outputs a laser beam from a cutting head to a workpiece and performs laser machining while controlling reflected light of the output laser beam, the laser machining apparatus including: a laser oscillator with a capacity to change laser power; a control unit configured to issue a command that the laser oscillator make an output in accordance with a machining condition; a reflected light sensor configured to measure the reflected light; and a preliminary machining determination unit configured to issue a command that a laser beam be output to the workpiece for a setting time at a laser power low enough not to melt or oxidize the workpiece before laser machining is performed on the workpiece, for selecting a laser power suitable for melting or oxidizing the workpiece based on a measured value of reflected light of the output laser beam, and for determining whether or not the workpiece can be melted or oxidized based on the selected laser power suitable for melting or oxidizing the workpiece.

BRIEF DESCRIPTION OF THE DRAWINGS

FIG. 5 is a database (D1) containing kinds of workpiece, reference values of reflected light from the workpieces and laser powers suitable for melting or oxidizing the workpieces, these data being associated with one another, according to the first embodiment.

FIG. 6 is a database (D2) containing a maximum output power of a laser oscillator according to the first embodiment.

FIG. 11 is a database (D1) containing kinds of workpiece, reference values of reflected light and laser power suitable for melting or oxidizing the workpieces, with the spot diameter at the surface of the workpiece being 100 µm, according to a fourth embodiment of the present invention.

FIG. 12 is a database (D2) containing laser information according to the fourth embodiment.

FIG. 13 is a database (D3) containing relations between focus position and spot diameter according to the fourth embodiment.

DETAILED DESCRIPTION

Figure 1:
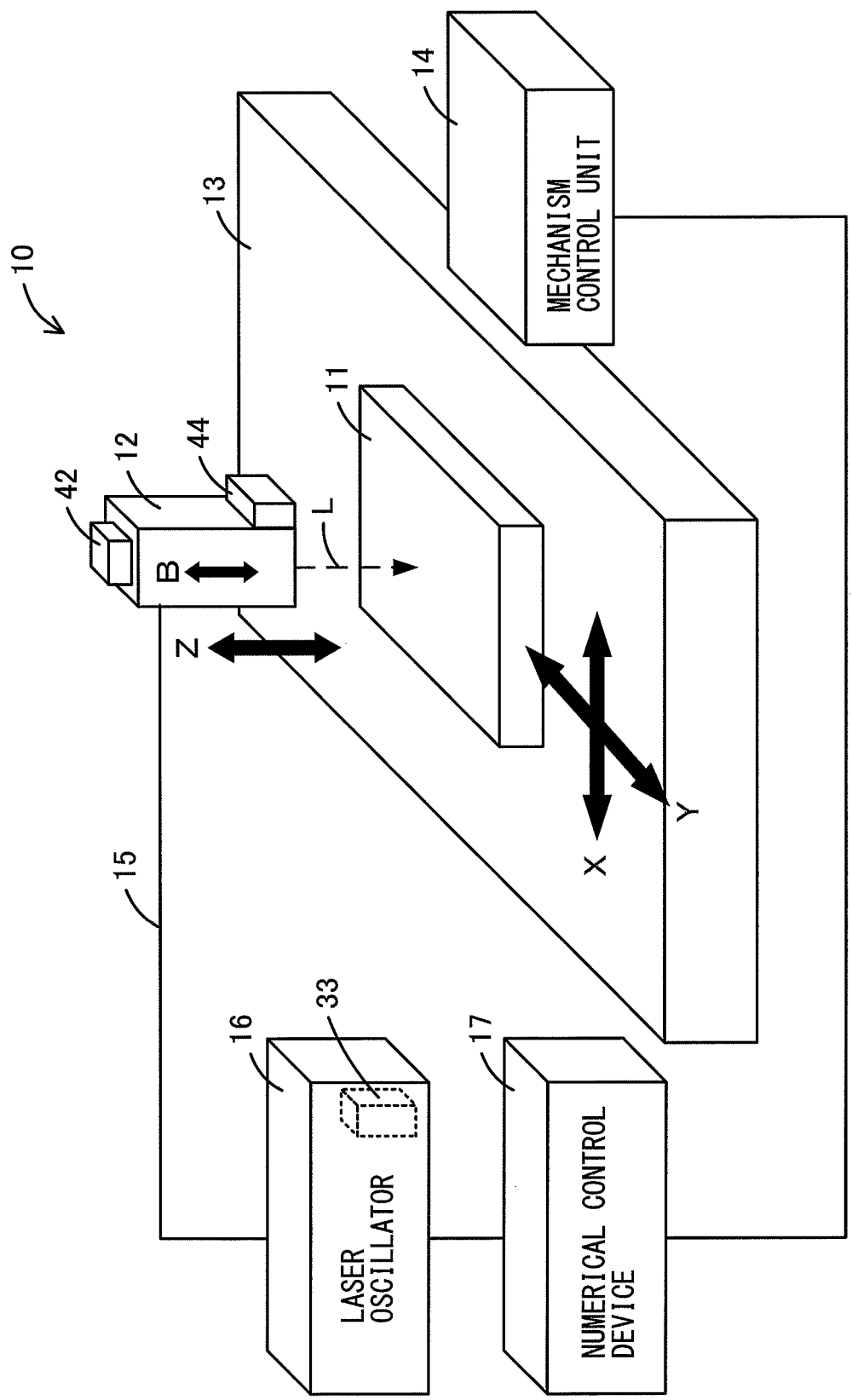
FIG. 1 is a schematic diagram illustrating a laser machining apparatus according to a first embodiment of the present invention.

Referring to the attached drawings, embodiments of the present invention will be described in detail. Like components are denoted by like reference numerals or signs throughout the drawings. The following descriptions are not intended to limit in any way the technical scope of the invention, which is described in the claims, or the meanings of the words used therein.

(First Embodiment)

Figure 2:
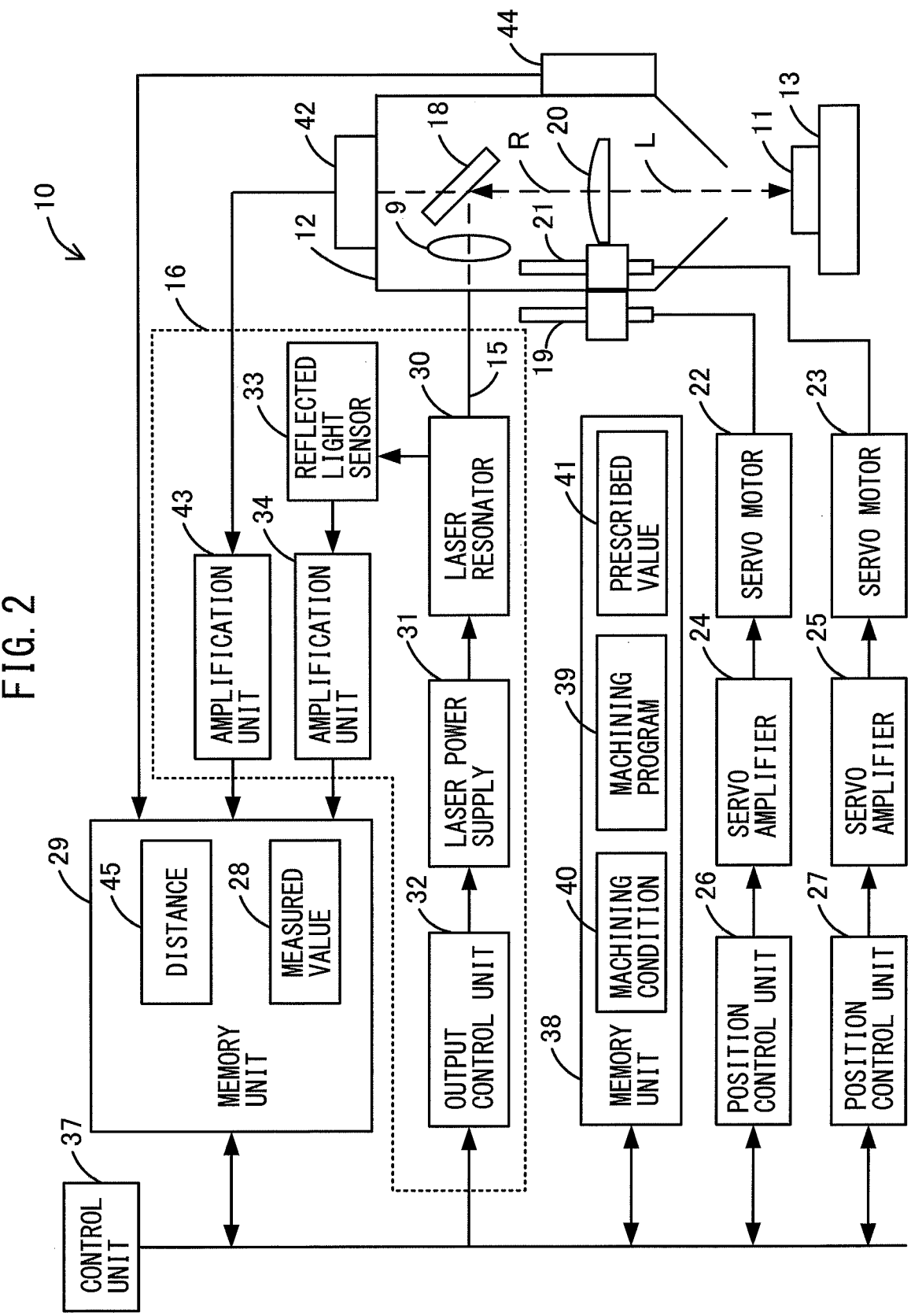
FIG. 2 is a block diagram of the laser machining apparatus according to the first embodiment.

Referring to FIG. 1 and FIG. 2, the configuration of a laser machining apparatus according to the first embodiment of the present invention will be described. FIG. 1 is a schematic diagram illustrating the laser machining apparatus according to the first embodiment. The laser machining apparatus 10 performs a preliminary machining for controlling reflected light before performing a laser machining on a workpiece 11, such as piercing, cutting, marking or welding. The laser machining apparatus 10 includes a cutting head 12 configured to output a laser beam L to the workpiece 11, a table 13 on which the workpiece 11 is placed, a mechanism control unit 14 configured to control the cutting head 12 and a mechanical unit of the table 13, a laser oscillator 16 connected with the cutting head 12 via an optical fiber 15, a numerical control device 17 configured to control the entire laser machining apparatus 10, a reflected light sensor 42 provided for the cutting head 12, a reflected light sensor 33 provided for the laser oscillator 16, and a gap sensor 44 configured to measure the distance between the nozzle of the cutting head 12 and the workpiece 11.

FIG. 2 is a block diagram of the laser machining apparatus according to the first embodiment. Referring to FIG. 2, the laser machining apparatus 10 includes a memory unit 38 configured to store a machining condition 40 and a machining program 39, and a control unit 37 configured to control the entire laser machining apparatus 10 in accordance with the machining program 39. The memory unit 38 is configured by a memory such as a RAM or a ROM, and the control unit 37 is configured by a processor such as a CPU or an MPU. The control unit 37 issues a laser beam output command to an output control unit 32 in accordance with the machining condition 40, and the output control unit 32 issues a pulse command generated in accordance with the output command to a laser power supply 31. The laser power supply 31 supplies electric power generated in accordance with the pulse command to a pumping laser light source and thereby enables pumping laser light to be supplied to a laser resonator 30, the pumping laser light causing the laser resonator 30 to resonate and emit a laser beam L.

The control unit 37 issues to position control units 26, 27 a position command on the positioning of the workpiece 11 relative to the cutting head 12 in accordance with the machining condition 40, and the position control units 26, 27 give pulse commands generated in accordance with the position command to servo amplifiers 24, 25. The servo amplifiers 24, 25 supply drive signals generated by integrating the pulse command with feedback pulses to servo motors 22, 23, and the servo motors 22, 23 respectively rotate a drive shaft 19 configured to change the position of the cutting head 12 along the Z axis and a drive shaft 21 configured to change the position of the focusing lens 20 inside the cutting head 12 along the B axis. For each of the X, Y, and Z axes, the laser machining apparatus 10 includes a position control unit, a servo amplifier, and a servo motor, though these are not illustrated.

The control unit 37 issues a command that a laser beam be output to the workpiece 11 for a setting time at a power low enough not to melt or oxidize the workpiece 11 to control reflected light before performing the laser machining proper (main machining). The laser beam L emitted from the laser resonator 30 goes into the cutting head 12 via the optical fiber 15, is turned into parallel rays by a collimation lens 9, reflected by a bender mirror 18 toward the workpiece 11, condensed by a focusing lens 20, and output to the workpiece 11. The output laser beam L reflects at the workpiece 11, the reflected light R is measured by the reflected light sensor 42 provided for the cutting head 12 or the reflected light sensor 33 provided for the laser oscillator 16. The reflected light R, measured by the reflected light sensors 33 or 42, is amplified by amplification units 34, 43, respectively, and the measurement value 28 is stored in the memory unit 29. The control unit 37 selects a laser power suitable for melting or oxidizing the workpiece 11 based on the measured value 28 of the reflected light.

The control unit 37 determines whether or not the workpiece 11 can be melted or oxidized, by determining whether or not the selected laser power suitable for melting or oxidizing the workpiece 11 exceeds the maximum output power of the laser oscillator 16. When the control unit 37 has determined that the workpiece 11 can be melted or oxidized, the control unit 37 issues a command that a laser beam be output to the workpiece 11 for a setting time at a laser power high enough to melt or oxidize the workpiece 11. Melting or oxidizing the workpiece 11 controls reflected light R during the laser machining. To check whether or not the workpiece 11 has indeed melted or oxidized, the control unit 37 issues again a command that a laser beam be output to the workpiece 11 for a setting time at the low laser power. The control unit 37 checks the degree of the melting or oxidization of the workpiece 11, based on the measurement value 28 of the reflected light R reflected on the workpiece 11, and when the degree of the melting or oxidization of the workpiece is sufficient, issues a command to start the main machining. When the degree of the melting or oxidization of the workpiece is not sufficient, the control unit 37 issues a command to cancel the main machining.

Figure 3:
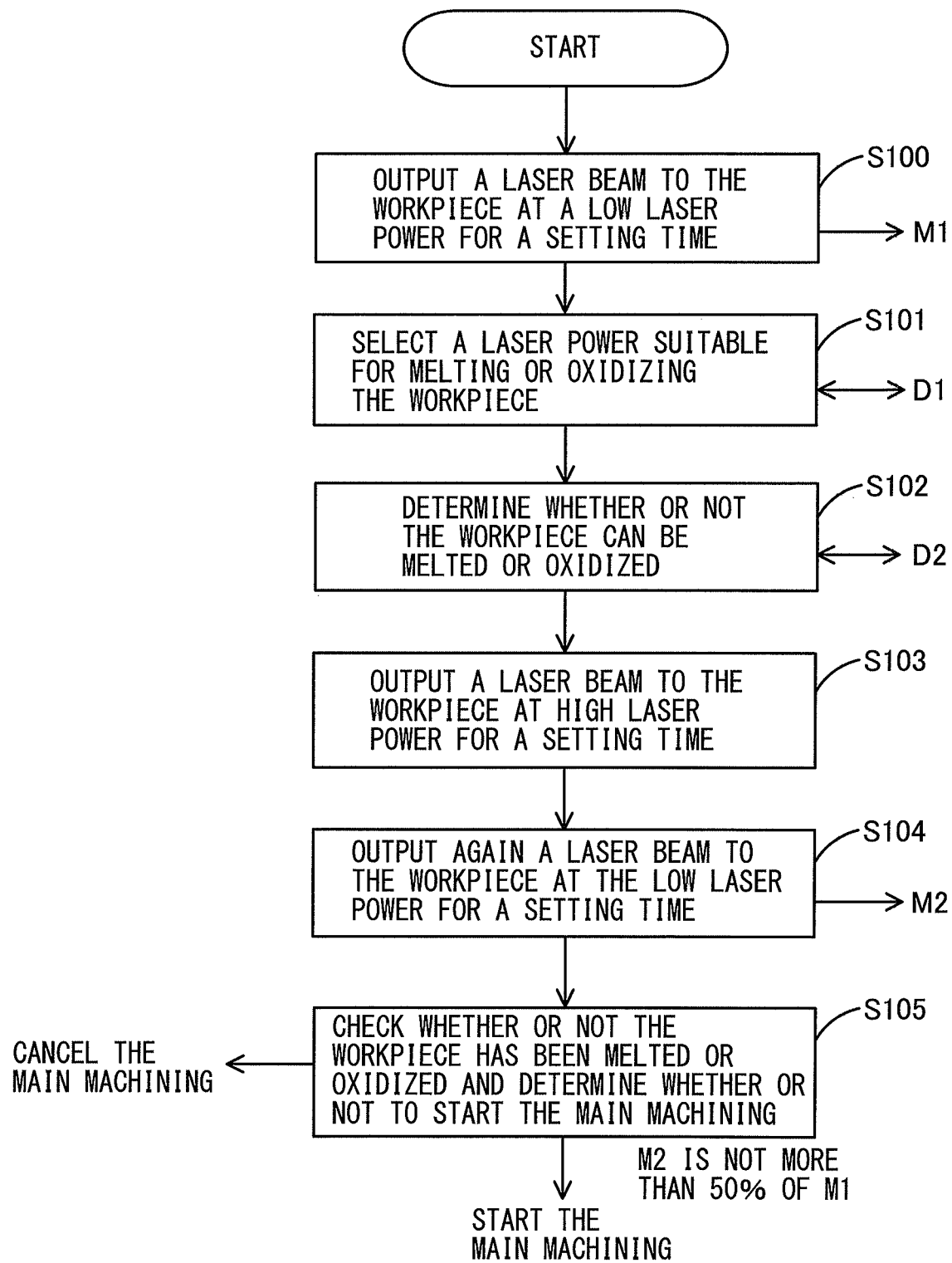
FIG. 3 is a flow chart illustrating a laser machining method according to the first embodiment.
Figure 4:
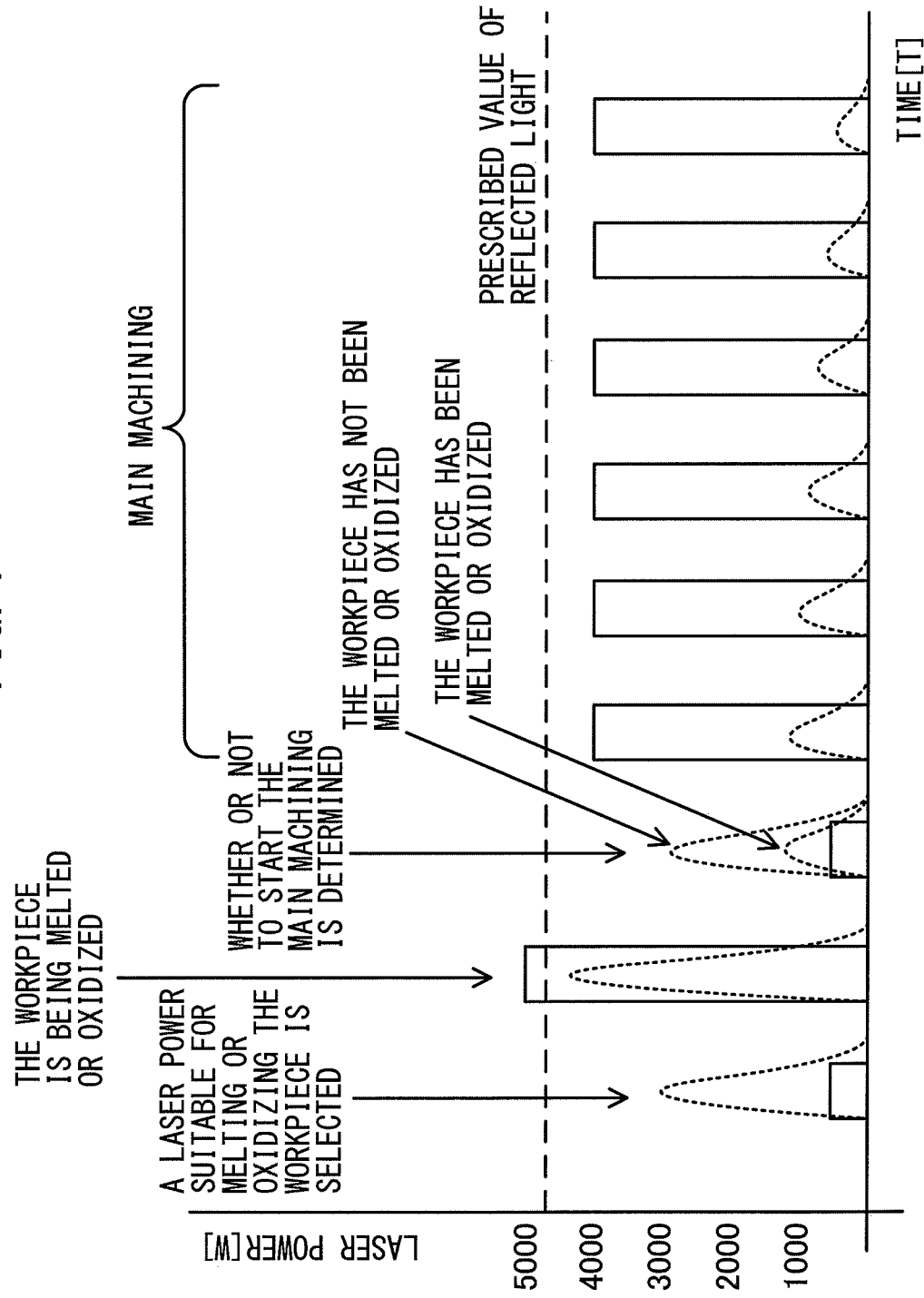
FIG. 4 is a graph illustrating a relation between laser power and measured values of reflected light according to the first embodiment.

Referring to the FIGS. 3 to 6, a laser machining method executed in the laser machining apparatus according to the first embodiment will be described. FIG. 3 is a flow chart illustrating the laser machining method according to the first embodiment, FIG. 4 is a graph illustrating a relation between laser power and measured values of reflected light according to the first embodiment, FIG. 5 is a database (D1) containing kinds of workpiece, reference values of reflected light from the workpieces and laser powers suitable for melting or oxidizing the workpieces, these data being associated with one another, according to the first embodiment, and FIG. 6 is a database (D2) containing a maximum output power of a laser oscillator according to the first embodiment. According to the first embodiment, these databases (D1, D2) are stored in the memory unit 38 illustrated in FIG. 2.

As illustrated in FIG. 3, in step S100, a laser beam is output to the workpiece at a laser power low enough not to melt or oxidize the workpiece for a short time (100 W, 1 ms), and the reflected light of the output laser beam is measured. The measured value of the reflected light (18 W) is stored as M1. In step S101, a laser power suitable for melting or oxidizing the workpiece is selected from D1, based on M1. Since M1 is 18 W (the reference value of the reflected light is 16 W ±3 W), it is determined that the laser power suitable for melting or oxidizing the workpiece (which is cast iron) is 550 W. In step S102, whether or not the workpiece can be melted or oxidized is determined by referring to D2. Since the laser power of 550 W, suitable for melting or oxidizing cast iron, is lower than 5000 W, which is the maximum output power of the laser oscillator according to D2, it is determined that the workpiece can be melted or oxidized.

When it is determined that the workpiece can be melted or oxidized, a laser beam is output to the workpiece at a laser power high enough to melt or oxidize the workpiece for a short time (in the present case, at the maximum output power 5000 W, 2 ms) in step S103. In step S104, a laser beam is output to the workpiece again at the low laser power for a short time (100 W, 1 ms), and the reflected light of the output laser beam is measured. The measured value of the reflected light (5 W) is stored as M2. In step S105, the degree of the melting or oxidization of the workpiece is checked based on M2, and it is determined whether or not to start the main machining. As M2 (5 W) is not more than 50% of M1 (18 W), it is determined that the degree of the melting or oxidization of the workpiece is sufficient and a command to start the main machining is issued. When M2 is more than 50% of M1, the main machining is canceled because the workpiece has not been melted or oxidized sufficiently for controlling reflected light.

According to the present aspect, even when the inputted machining condition is not optimum for the material, surface condition, or inclination of the workpiece, the focal position of the laser beam, or other factors, the laser oscillator will not suffer damage, and laser machining will be stably executed with increased productivity.

It is preferable that in the step of outputting a laser beam before the main machining, the reflected light R reflected on the workpiece 11 does not exceed the prescribed value 41 in FIG. 2 or the prescribed value line in FIG. 4. However, if it is only for a short time (e.g. not more than 2 ms) that the reflected light coming from the workpiece exceeds the prescribed value, the laser oscillator will not be affected.

(Second Embodiment)

Figure 7:
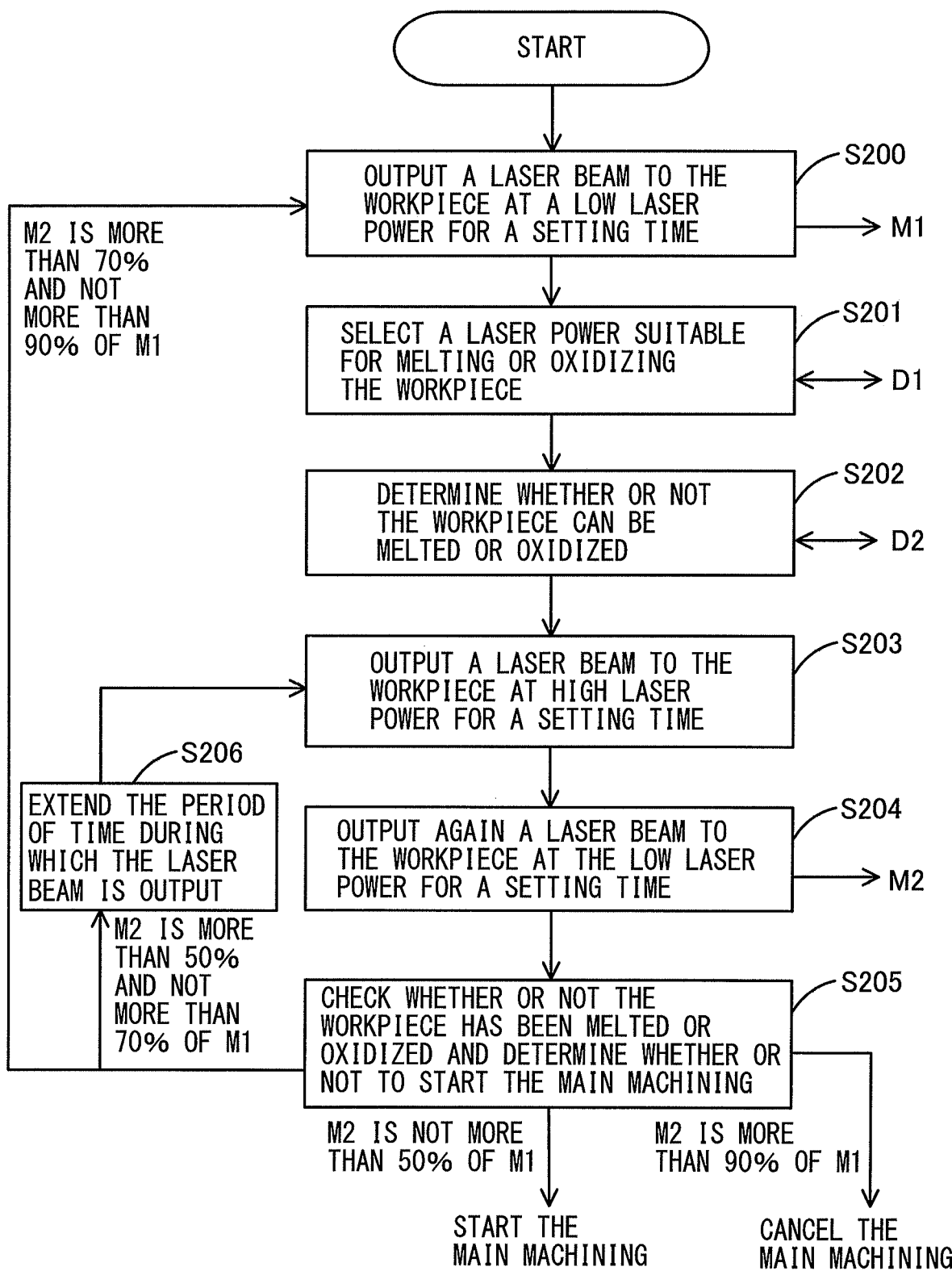
FIG. 7 is a flow chart illustrating a laser machining method according to a second embodiment of the present invention.
Figure 8:
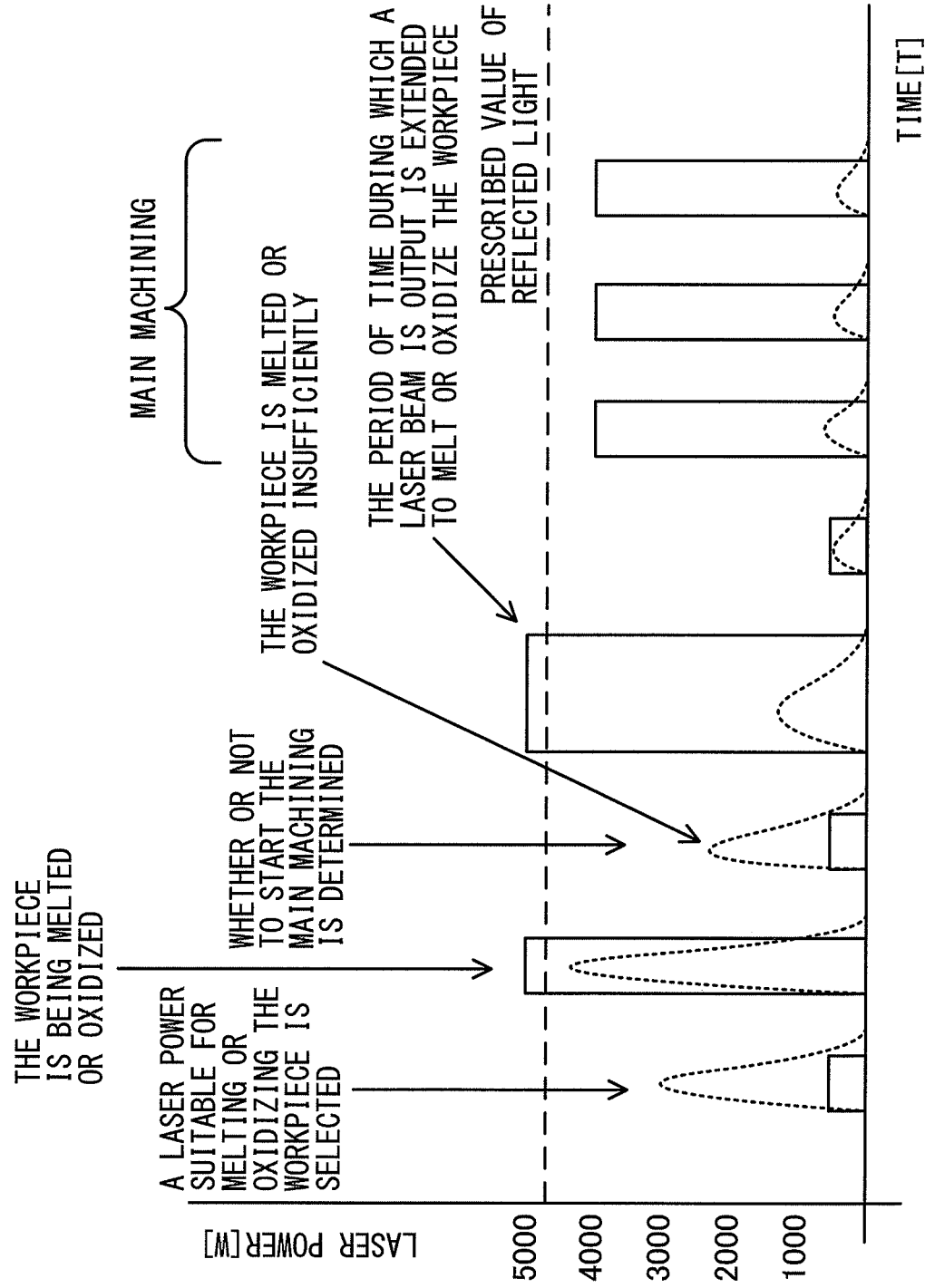
FIG. 8 is a graph illustrating a relation between laser power and measured values of reflected light according to the second embodiment.

Referring now to FIGS. 7 and 8, a laser machining method according to a second embodiment of the present invention will be described. The configuration of the laser machining apparatus according to the second embodiment is the same as that of the laser machining apparatus according to the first embodiment, and will not be further described. FIG. 7 is a flow chart illustrating a laser machining method according to the second embodiment of the present invention, and FIG. 8 is a graph illustrating a relation between laser power and measured values of reflected light according to the second embodiment. Steps S200 to S205 in FIG. 7 are like steps S100 to S105 according to the first embodiment, and will not be further described.

When the measured value (M2) of the reflected light, measured in order to check the degree of the melting or oxidization of the workpiece, turns out to be more than 50% and not more than 70% of the measured value (M1) of the reflected light, measured in order to select a laser power suitable for melting or oxidizing the workpiece in step S205 (when the degree of the melting or oxidization of the workpiece is moderately insufficient), it is preferable that the period of time during which a laser beam is output is extended in step S206 (by 2 ms), and then a laser beam is output to the workpiece again at the high laser power for a short time (5000 W, 4 ms) in step S203. When M2 is more than 70% and not more than 90% of M1 (when the degree of the melting or oxidization of the workpiece is considerably low), a laser beam is output to the workpiece again at the low laser power, back in step S200, for a short time (100 W, 2 ms) and then, steps S200 to S205 are repeated.

According to this aspect, the workpiece is melted or oxidized at an early stage, allowing the main machining to be started soon.

(Third Embodiment)

Figure 9:
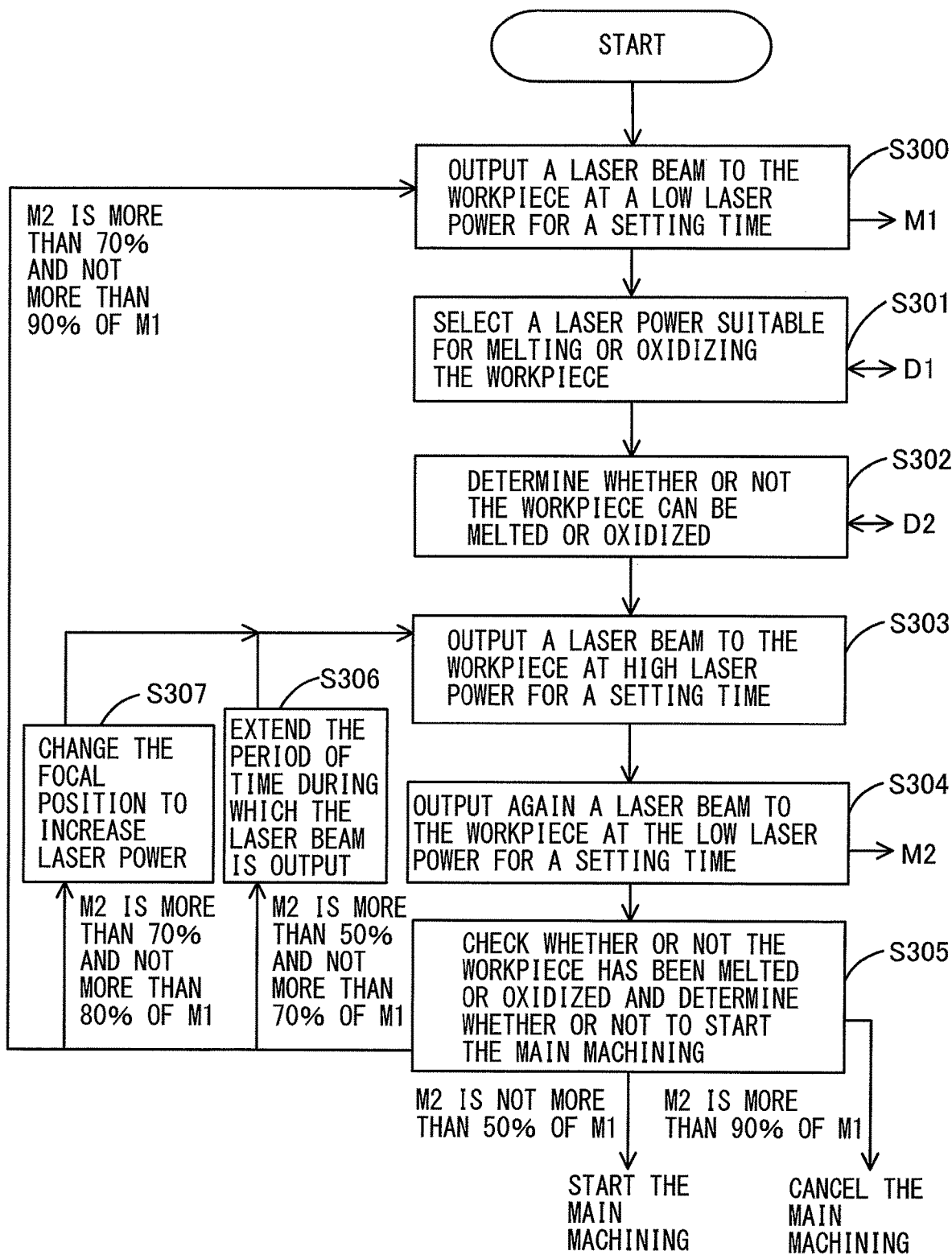
FIG. 9 is a flow chart illustrating a laser machining method according to a third embodiment of the present invention.
Figure 10:
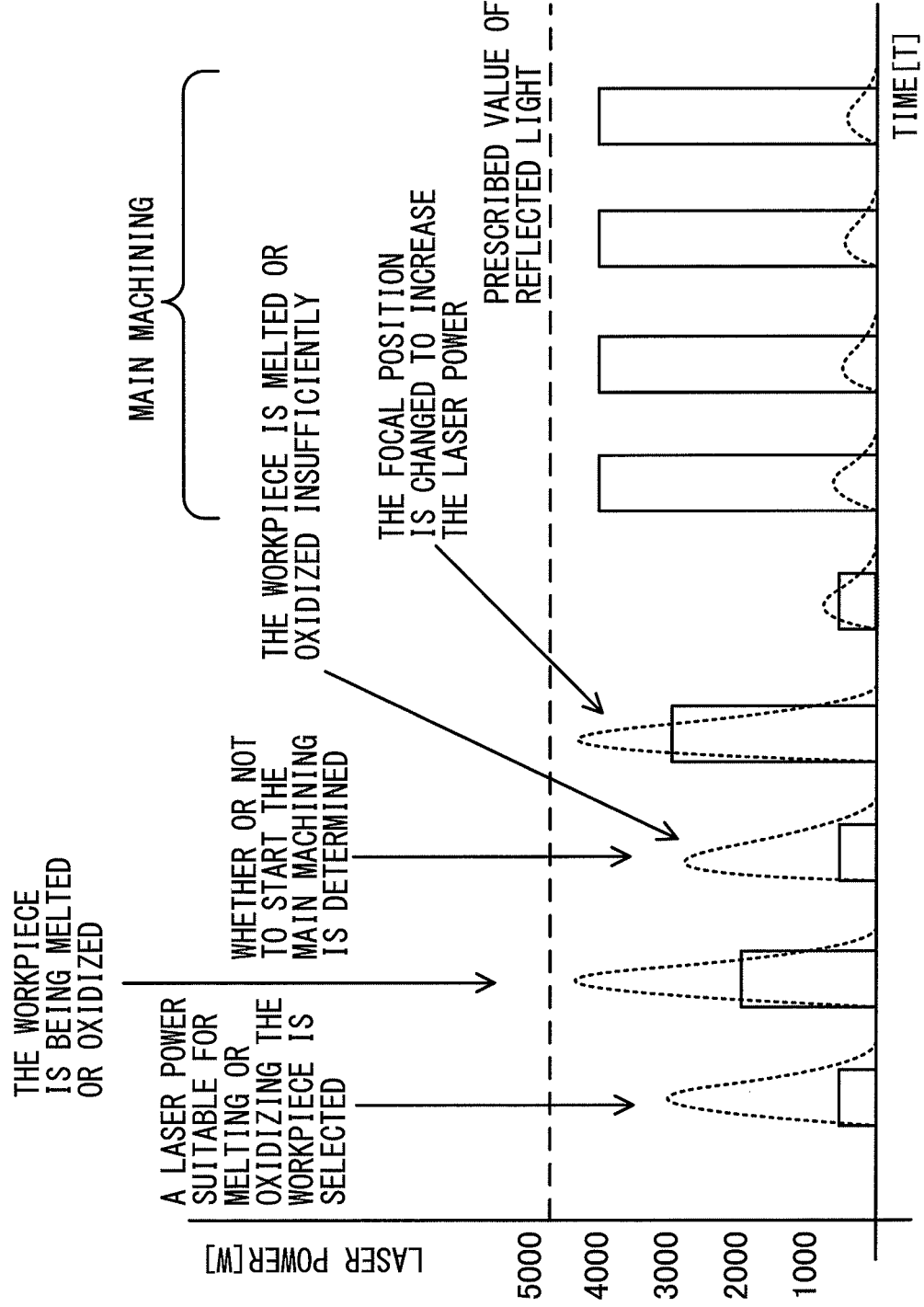
FIG. 10 is a graph illustrating a relation between laser power and measured values of reflected light according to the third embodiment.

Referring now to FIGS. 9 and 10, a laser machining method according to the third embodiment of the present invention will be described. The configuration of the laser machining apparatus according to the third embodiment is the same as that of the laser machining apparatus according to the first embodiment, and will not be further described. FIG. 9 is a flow chart illustrating the laser machining method according to the third embodiment of the present invention, and FIG. 10 is a graph illustrating a relation between laser power and measured values of reflected light according to the third embodiment. In FIG. 9, steps S300 to S306 are the same as steps S200 to S206 according to the second embodiment.

When the measured value (M2) of the reflected light, measured in order to check the degree of the melting or oxidization of the workpiece, turns out to be more than 70% and not more than 80% of the measured value (M1) of the reflected light, measured in order to select a laser power suitable for melting or oxidizing the workpiece in step S305 (when the degree of the melting or oxidization of the workpiece is insufficient), the focal position of the laser beam is changed upwards to increase the laser power (increase by 1000 W) in step S307, and then a laser beam is output to the workpiece again at the high laser power for a short time (3000 W, 2 ms) in step S303. However, the third embodiment is possible only when the laser power initially used in step S303 (2000 W) is lower than the maximum output power of the laser oscillator (5000 W).

According to this aspect, a laser beam can be output to the workpiece at a high laser power by changing the focal position even when the workpiece is a highly reflexive material such as aluminum, and the workpiece is melted or oxidized at an early stage, allowing the main machining to be started soon.

(Fourth Embodiment)

Figure 14:
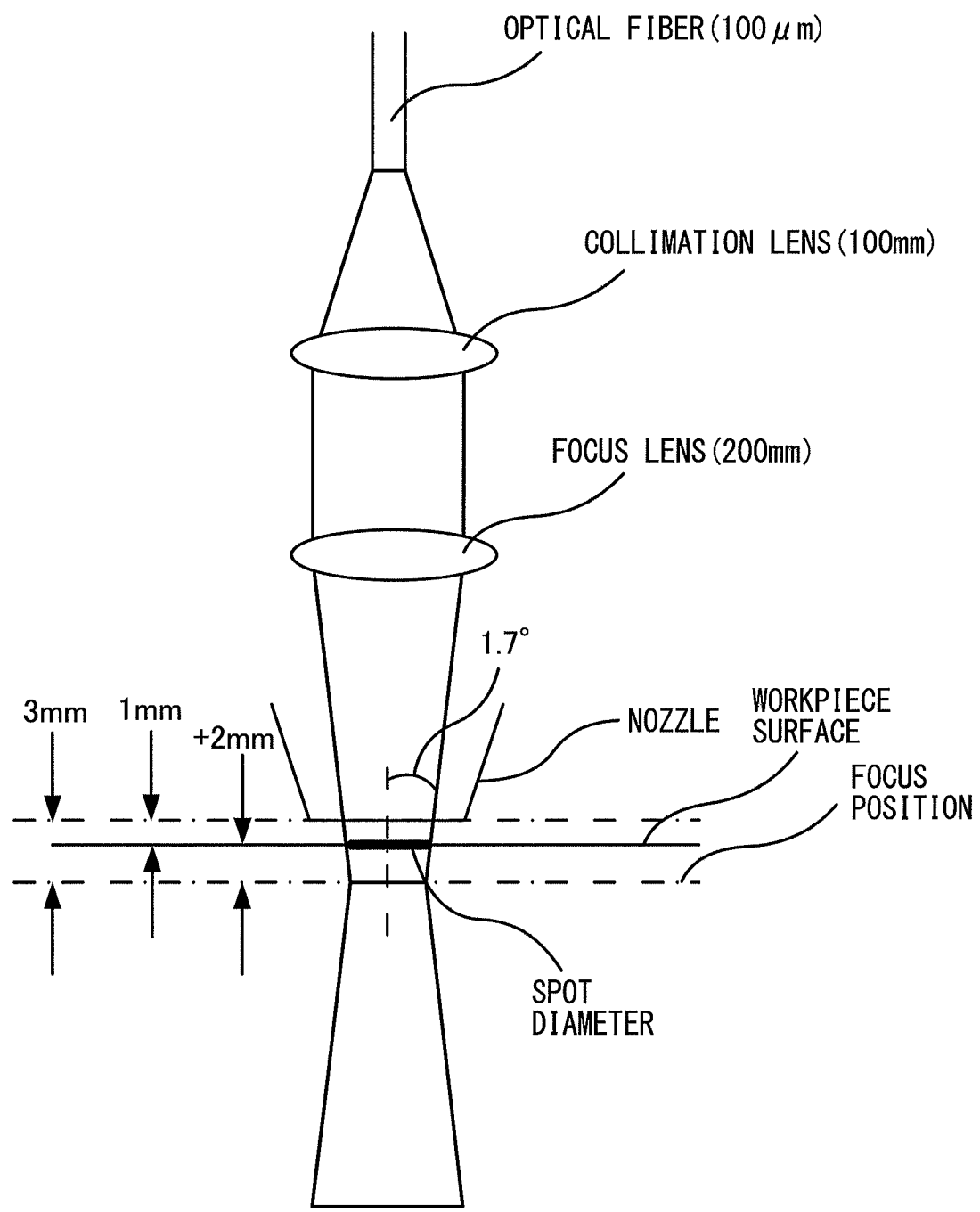
FIG. 14 is a diagram illustrating a calculation method for calculating a spot diameter on a workpiece surface according to the fourth embodiment.

Referring now to FIGS. 11 to 14, a laser machining method according to a fourth embodiment of the present invention will be described. The configuration of the laser machining apparatus according to the fourth embodiment is like the laser machining apparatus according to the first embodiment except that, in particular, a gap sensor 44 is provided for measuring the distance between the workpiece 11 and the nozzle of the cutting head 12, that the spot diameter on the workpiece surface is calculated based on the distance between the workpiece and the nozzle, and that the calculated spot diameter on the workpiece surface is used for selecting a laser power suitable for melting or oxidizing the workpiece. FIG. 11 is a database (D1) containing kinds of workpiece, reference values of reflected light reflected on the workpieces, and laser powers suitable for melting or oxidizing the workpieces, these data being associated with one another, according to the fourth embodiment of the present invention, FIG. 12 is a database (D2) containing laser information according to the fourth embodiment, FIG. 13 is a database (D3) containing a relation between focus position relative to the workpiece and spot diameter on the workpiece surface according to the fourth embodiment, and FIG. 14 is a diagram illustrating a calculation method for calculating a spot diameter on a workpiece surface according to the fourth embodiment. According to the fourth embodiment these databases (D1 to D3) are stored in the memory unit 38 illustrated in FIG. 2. D1 illustrated in FIG. 11 contains data in a case when the spot diameter at the focal position is 100 μm, and D2 illustrated in FIG. 12 may be changed when the laser machining apparatus is configured differently.

Referring to the flow chart in FIG. 3, the laser machining method according to the fourth embodiment will be described. First, in step S100, a laser beam is output to the workpiece at a low laser power for a short time (100 W, 1 ms), and the reflected light of the output laser beam is measured (M1 is 90 W). In step S101, it is found, first of all, that the focal position relative to the nozzle is 3 mm and the angle of divergence is 1.7° by referring to D2. The spot diameter at the focal position is calculated by the fiber diameter divided by the focal distance of the collimation lens multiplied by the focal distance of the focusing lens, and by referring to D2, it is calculated to be 200 μm (=100 μm/100 mm×200 mm). When the distance between the workpiece and the nozzle measured by the gap sensor 44 is 1 mm, the present focal position relative to the workpiece is calculated to be +2 mm (=3 mm−1 mm), referring to FIG. 14, and the spot diameter on the present workpiece surface is calculated to be 318 μm (=tan (1.7°)×2 mm×2+200 μm). Since M1 is 90 W in the present example, when the spot diameter at the focal position is 100 μm, it is found that the laser power suitable for melting or oxidizing the workpiece (aluminum #5000) is 950 W, by referring to D1. The amount of heat per unit density of a laser beam with a spot diameter at the focal position of 200 μm is a quarter of that of a laser beam with a spot diameter at the focal position of 100 μm. Since the spot diameter on the present workpiece surface is 318 μm, the laser power needs to be 9606 W, 10 times higher than when the spot diameter is 100 μm.

In step S102, the maximum output power of the laser oscillator is 5000 W, which is lower than 9606 W, with reference to D2, and it is determined that aluminum #5000 cannot be melted or oxidized. The main machining is canceled in this case. The other steps are the same as in the laser machining method according to the first embodiment, and will not be further described. Since the laser machining apparatus includes the gap sensor 44 and the databases D1 to D3, the laser beam is output to the workpiece more accurately, enabling the workpiece to be melted or oxidized without fail before the main machining.

(Fifth Embodiment)

Figure 15:
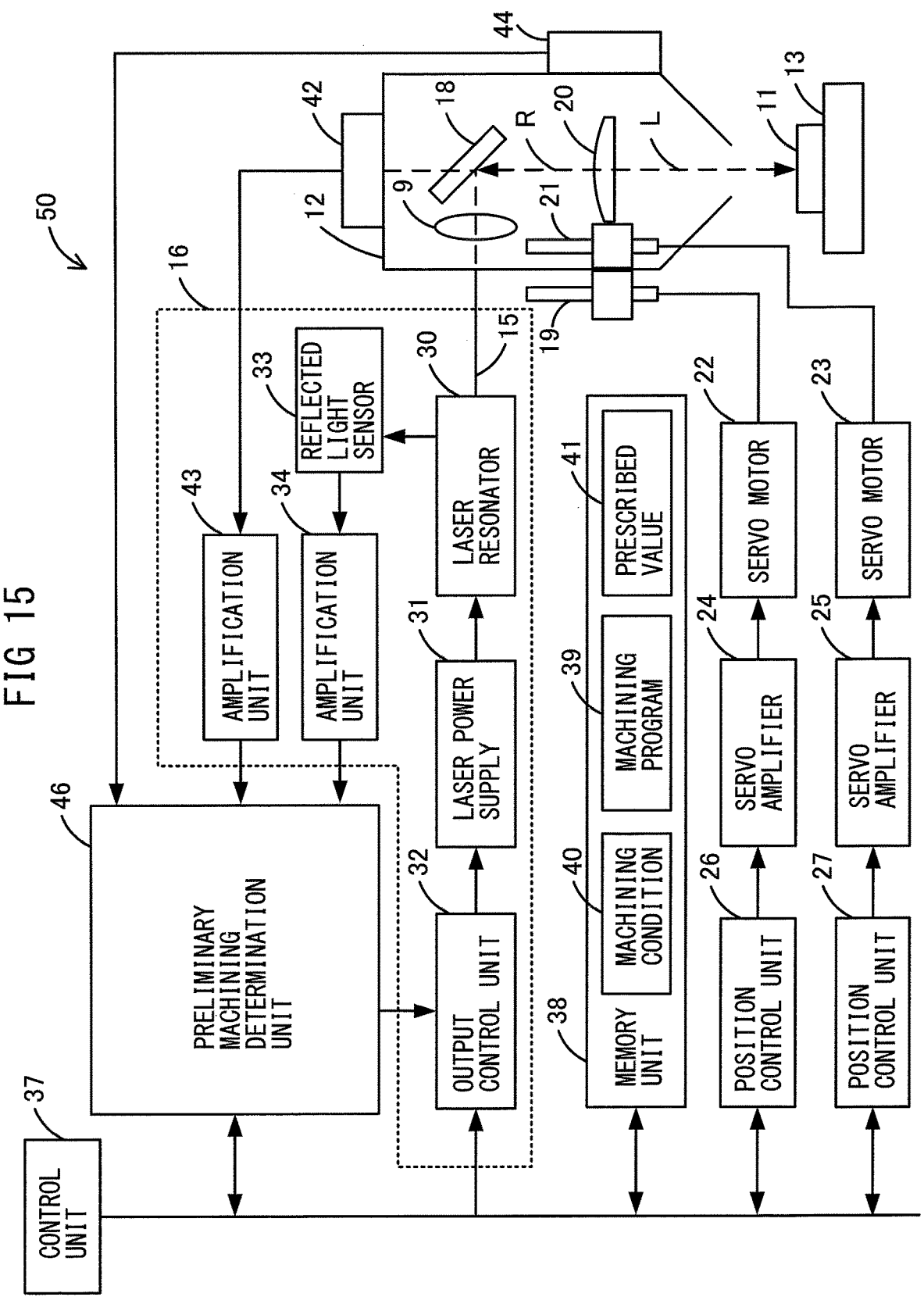
FIG. 15 is a block diagram of a laser machining apparatus according to a fifth embodiment of the present invention.

Referring now to FIG. 15, a laser machining method according to a fifth embodiment of the present invention will be described. A laser machining apparatus 50 according to the fifth embodiment includes a preliminary machining determination unit 46 configured to issue a command that a laser beam be output to the workpiece for a setting time (100 W, 1 ms) at a laser power low enough not to melt or oxidize the workpiece before the main machining, for calculating a laser power suitable for melting or oxidizing the workpiece based on the measured value (M1) of the reflected light of the output laser beam, and for determining whether or not the workpiece can be melted or oxidized based on the calculated power suitable for melting or oxidizing the workpiece. The preliminary machining determination unit 46 is configured by an integrated circuit or electric circuit such as an ASIC or FPGA, though the configuration is not limited thereto, and executes the same laser machining method as according to the fourth embodiment. Since the preliminary machining determination unit 46 is configured by hardware such as an integrated circuit, the main machining may be started sooner.

(Sixth Embodiment)

Referring now to FIG. 3, a laser machining method according to a sixth embodiment of the present invention will be described. The configuration of the laser machining apparatus according to the sixth embodiment is the same as that of the laser machining apparatus according to the first embodiment, and will not be further described. In step S100, a laser beam is output to the workpiece for a setting time at a laser power low enough not to melt or oxidize the workpiece (100 W, 1 ms), and the reflected light of the output laser beam is measured, and then in step S101, reflectance A of the reflected light (which is a ratio of measured value of reflected light (18 W) to the low laser power (100 W). In the present example, reflectance A=18%.) is calculated. A laser power suitable for melting or oxidizing the workpiece is selected based on the calculated reflectance A.

When reflectance A is equal to or more than 98%, the laser power suitable for melting or oxidizing the workpiece is 2800 W; when reflectance A is equal to or more than 92% and less than 98%, the laser power suitable for melting or oxidizing the workpiece is 2500 W; when reflectance A is equal to or more than 76% and less than 92%, the laser power suitable for melting or oxidizing the workpiece is 2000 W; when reflectance A is equal to or more than 61% and less than 76%, the laser power suitable for melting or oxidizing the workpiece is 1400 W; when reflectance A is equal to or more than 47% and less than 61%, the laser power suitable for melting or oxidizing the workpiece is 1200 W; when reflectance A is equal to or more than 33% and less than 47%, the laser power suitable for melting or oxidizing the workpiece is 900 W; when reflectance A is equal to or more than 19% and less than 33%, the laser power suitable for melting or oxidizing the workpiece is 700 W; and when reflectance A is less than 19%, the laser power suitable for melting or oxidizing the workpiece is 550 W. When reflectance A is 18%, therefore, the laser power suitable for melting or oxidizing the workpiece is 550 W.

In step S102, whether the workpiece can be melted or oxidized or not is determined. Since the maximum output power of the laser oscillator is 5000 W as illustrated in FIG. 6, it is determined that the workpiece can be melted or oxidized.

Advantageous effects of the present invention will be described below. According to the present invention, even when the machining condition inputted to the laser machining apparatus is not optimum for the material, surface condition, or inclination of the workpiece, the focal position of laser beam, or other factors, the laser oscillator will not suffer damage, and laser machining will be stably executed, with increased productivity.

It should be noted that the program for above-mentioned embodiments may be provided by recording it in a machine readable non-volatile recording medium, such as a CD-ROM.

Although various embodiments have been described herein, it should be understood that the present invention is not limited to the various embodiments described above, and that various modifications can be made within the scope of the invention as described in the appended claims.

The invention claimed is:

1. A laser machining method executed in a laser machining apparatus that outputs a laser beam from a cutting head to a workpiece and performs laser machining while controlling reflected light of the output laser beam, the laser machining method comprising the steps of:

outputting the laser beam to the workpiece for a setting time at a laser power low enough not to melt or oxidize the workpiece to measure reflected light of the output laser beam before performing laser machining on the workpiece;

comparing a measured value of the reflected light to a predetermined reference value, wherein the predetermined reference value is based on a type of the workpiece, and is associated with a laser power suitable for melting or oxidizing the workpiece;

selecting the laser power suitable for melting or oxidizing the workpiece associated with the predetermined reference value based on the comparison;

determining whether or not the workpiece can be melted or oxidized based on the selected laser power suitable for melting or oxidizing the workpiece;

when the determining indicates that the workpiece can be melted or oxidized, outputting a laser beam to the workpiece for a setting time at a laser power high enough to melt or oxidize the workpiece;

outputting again a laser beam to the workpiece for a setting time at the low laser power to measure reflected light of the output laser beam; and checking whether or not the workpiece has been melted or oxidized based on a measured value of the reflected light to determine whether or not to start the laser machining.

2. The laser machining method according to claim 1, wherein the laser machining apparatus comprises a first database containing a reference value of the reflected light when a laser beam is output to the workpiece for a setting time at the low laser power, the reference value being associated with a laser power suitable for melting or oxidizing the workpiece, and a second database containing a maximum output power of the laser machining apparatus;

wherein the step of selecting a laser power suitable for melting or oxidizing the workpiece comprises the step of referring to the first database to select a laser power suitable for melting or oxidizing the workpiece associated with the reference value of the reflected light, based on the measured value of the reflected light; and wherein the step of determining whether or not the workpiece can be melted or oxidized comprises the step of determining whether or not the workpiece can be melted or oxidized based on the selected laser power suitable for melting or oxidizing the workpiece and the maximum output power of the laser machining apparatus contained in the second database.

3. The laser machining method according to claim 1, wherein the step of determining whether or not the workpiece can be melted or oxidized comprises the step of determining whether or not the workpiece can be melted or oxidized based on the selected laser power suitable for melting or oxidizing the workpiece and a maximum output power of the laser machining apparatus.

4. The laser machining method according to claim 1, wherein the step of outputting a laser beam to the workpiece for a setting time at the high laser power is repeated when the workpiece is melted or oxidized insufficiently.

5. The laser machining method according to claim 4, further comprising a step of extending the period of time during which a laser beam is output before repeating the step of outputting a laser beam to the workpiece for a setting time at the high laser power.

6. The laser machining method according to claim 4, further comprising the step of changing a focal position to increase laser power before repeating the step of outputting a laser beam to the workpiece for a setting time at the high laser power.

7. The laser machining method according to claim 2, wherein the laser machining apparatus further comprises a third database containing a spot diameter on a workpiece surface.

8. The laser machining method according to claim 7, wherein the laser machining apparatus further comprises a fourth database containing characteristics of the laser beam and optical specifications of the cutting head, and wherein the method further comprises a step of calculating a spot diameter at a focal position based on the fourth database.

9. The laser machining method according to claim 8, wherein the laser machining apparatus further comprises a gap sensor configured to measure a distance between the workpiece and a nozzle of the cutting head, and wherein the step of selecting a laser power suitable for melting or oxidizing the workpiece further comprises the steps of:
calculating a spot diameter on a workpiece surface based on the distance between the workpiece and the nozzle of the cutting head, and
selecting a laser power suitable for melting or oxidizing the workpiece based on the calculated spot diameter on the workpiece surface.

* * * * *